(12) United States Patent
Ryan et al.

(10) Patent No.: US 10,437,614 B2
(45) Date of Patent: Oct. 8, 2019

(54) SYSTEM AND METHOD FOR DESIGNATING MULTI-OBJECT FAVORITES

(71) Applicant: salesforce.com, inc., San Francisco, CA (US)

(72) Inventors: Joseph Ryan, Moraga, CA (US); Yon Aran Rhee, Bainbridge Island, WA (US); David M. Brady, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 79 days.

(21) Appl. No.: 15/874,437

(22) Filed: Jan. 18, 2018

(65) Prior Publication Data

US 2019/0138328 A1    May 9, 2019

Related U.S. Application Data

(60) Provisional application No. 62/581,440, filed on Nov. 3, 2017.

(51) Int. Cl.
*G06F 9/451* (2018.01)
*G06F 3/0481* (2013.01)
*G06F 3/0482* (2013.01)
*G06F 16/907* (2019.01)

(52) U.S. Cl.
CPC ............ *G06F 9/451* (2018.02); *G06F 3/0481* (2013.01); *G06F 3/0482* (2013.01); *G06F 16/907* (2019.01)

(58) Field of Classification Search
CPC ....................................................... G06F 17/30
See application file for complete search history.

(56) References Cited

U.S. PATENT DOCUMENTS

| | | | |
|---|---|---|---|
| 7,216,298 B1 * | 5/2007 | Ballard et al. ............ | G06F 3/00 |
| 7,293,237 B1 * | 11/2007 | Knight et al. ............ | G06F 3/00 |
| 10,203,841 B2 * | 2/2019 | Marseille et al. ....... | G06F 3/048 |
| 2004/0153973 A1 * | 8/2004 | Horwitz ................... | G06F 17/21 |
| 2015/0100982 A1 * | 4/2015 | Sirpal et al. .......... | G06F 3/0484 |
| 2017/0031882 A1 * | 2/2017 | Myers ................. | G06F 17/2247 |

* cited by examiner

*Primary Examiner* — James J Debrow
(74) *Attorney, Agent, or Firm* — Sterne, Kessler, Goldstein & Fox P.L.L.C.

(57) ABSTRACT

Disclosed herein are system, method, and computer program product embodiments for designating objects of disparate types as favorites. In an embodiment, a cloud computing platform provides content and applications for a user to utilize for cloud computing. Users are able to designate content, applications, and/or contexts (i.e., a combination of content and applications) as favorites. By storing metadata related to these disparate data types, the cloud computing platform is able to generate an inclusive list of favorite objects that users may utilize to retrieve specific graphical user interfaces. The cloud computing platform is also able to provide specific layout recreation by allowing users to designate a context as a favorite object.

20 Claims, 6 Drawing Sheets

SYSTEM AND METHOD FOR DESIGNATING MULTI-OBJECT FAVORITES

CROSS-REFERENCE TO RELATED APPLICATIONS

This application claims the benefit of U.S. Provisional Patent Application No. 62/581,440 filed Nov. 3, 2017, entitled "System and Method for Designating Multi-Object Favorites," the entirety of which is hereby incorporated by reference.

This application is related to U.S. Provisional Patent Application No. 62/581,598, filed Nov. 3, 2017 and U.S. Non-Provisional application Ser. No. 15/874,715, filed concurrently herewith, both entitled "Single Tap Control for Adding and Managing Favorites," the entirety of which are hereby incorporated by reference.

BACKGROUND

As computing moves from a native-based computing environment to a more cloud-based platform, computing complexity grows as well. As users access different content and applications on these cloud-based platforms, users face the burden of navigating and configuring the user interface so that desired information and application functionality may be used in a desired manner. While cloud-based computing platforms offer a large variety of applications and content resources, users face the burden of filtering through undesired applications and content in order to find what the users are seeking. Users are unable to manage applications and content simultaneously and further lack the ability to easily summon a combination of applications and content resources for viewing and manipulation.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for designating multi-object favorites.

The systems and methods described herein operate to store shortcuts and/or object links to allow users to quickly access applications and/or content. The systems and methods allow users to designate disparate types of data and/or executable software programs as favorite objects. By designating an object as a "favorite," users are able to quickly recall the objects at a later time and/or restore a previous graphical user interface representation of the object. In an embodiment, the object may be a particular arrangement of one or more applications and/or content on a graphical user interface.

The term "object" as used in this disclosure may refer to content, applications, and/or computing contexts. Content may be sources of information, data, and/or representations of data. For example, content may be a webpage, web tabs, a text file, a video file, an audio file, a spreadsheet, a presentation, posts or messages in a communication interface, a calendar event, records, reports, lists, notes, and/or other instances of recorded data that may be accessible. Applications may be executable software programs. For example, applications may be word processing programs, spreadsheet processing programs, email management programs, communication messaging programs, calendar applications, contact list management programs, time management programs, programming interfaces, video manipulation programs, drawing programs, data visualization programs, games, and/or other computing programs. In an embodiment, applications may utilize a Software as a Service (SaaS) configuration and/or provide cloud-based computing features to a native operating system.

In an embodiment, a "context" or "computing context" may refer to a particular layout of content and applications. For example, a user may organize content and/or applications in a particular configuration on a graphical user interface. The user may also designate content that may appear and/or be utilized by particular applications within this configuration. The "context" in this scenario may refer to the user's particular configuration and/or layout. An embodiment of an example context is described with reference to FIG. 2A and FIG. 2B. By saving this context and/or by designating the context object as a "favorite," users are able to readily recall the arrangement and/or layout of content or application objects at a future time. The systems and methods described herein retain metadata related to this context and are able to reconstruct the user's graphical user interface layout using the stored metadata. In this manner, users may be able to organize content and applications in desired configurations and utilize the systems and methods described herein to reconstruct the visual configuration without needing to manually select and place the content and/or application to achieve the past configuration. Further, users are able to designate multiple contexts as favorites and select the different contexts to quickly reconfigure the content, applications, and/or content-application interactions displayed on a graphical user interface.

These features will now be discussed with respect to the corresponding figures.

Figure 1:
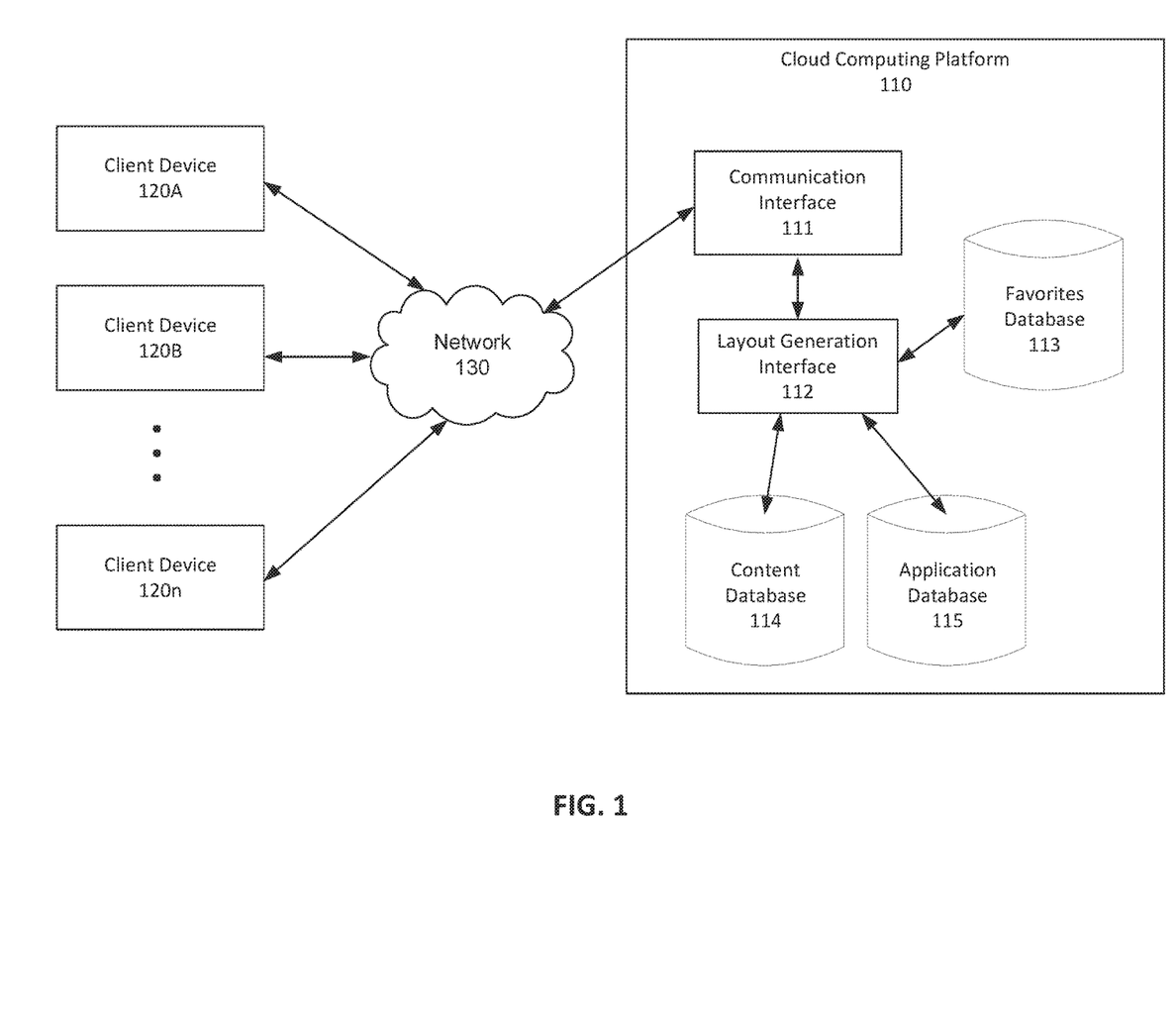
FIG. 1 illustrates a block diagram of a multi-object favorite designation environment, according to some embodiments.

FIG. 1 illustrates a block diagram of a multi-object favorite designation environment 100, according to some embodiments. In an embodiment, multi-object favorite designation environment 100 allows users to select objects to designate as a favorite. These objects may be content, applications, and/or contexts. In an embodiment, multi-object favorite designation environment 100 provides cloud computing capabilities to end users. Users may then designate favorite objects within the cloud computing platform. In an embodiment, multi-object favorite designation environment 100 includes cloud computing platform 110, client devices 120A, 120B, . . . 120n, and network 130.

In an embodiment, cloud computing platform 110 provides cloud computing functionality to client devices 120. Client devices 120 may utilize network 130 to access cloud computing platform 110 and perform computing operations in a cloud-based manner. Additionally, client device 120 may designate objects as favorites within cloud computing platform 110. These objects may include content, applications, and/or contexts. Cloud computing platform 110 manages these system resources as well as user account information to manage user accounts and objects designated as favorites for those user accounts. Cloud computing platform 110 also manages layout and/or graphical user interface configuration information for users so that users may select contexts. A context selection may cause cloud computing platform 110 to retrieve a saved configuration of content and/or applications and generate a previously saved layout for display at client device 120.

In an embodiment, cloud computing platform 110 includes one or more processors, memory, servers, routers, modems, and/or antennae configured to interface with network 130 and/or client devices 120. Cloud computing platform 110 executes and manages a cloud-based computing platform and/or user access to the cloud-based computing platform. The cloud-based computing platform may be, for example, a remote desktop, a virtual desktop or virtual computing, a cloud-computing platform, an enterprise computing platform, a cloud-based software application, an Infrastructure as a Service (IaaS) application, a Platform as a Service (PaaS) application, and/or or other types of cloud-based computing. In an embodiment, to enable the cloud-based computing functionality, cloud computing platform 110 may utilize a centralized hardware architecture using, for example, a server and/or database configuration. In an embodiment, cloud computing platform 110 may utilize a distributed hardware architecture, including distributed systems and/or subsystems. The distributed systems may include one or more servers and/or databases interfaced via network 130.

In an embodiment, cloud computing platform 110 may execute an operating system allowing users to perform native computing functions in a virtual environment. For example, users may be able to store, manipulate, and/or manage data and/or content in the virtual environment. Data and/or content may be text, image, audio, video, and/or other data submitted by a user. In an embodiment, the virtual environment also allows a user to enable and utilize software in conjunction with the remote computing functionality. Users may select and/or enable applicable applications, software, and/or functions of the virtual environment based on the computing needs of the user. In an embodiment, cloud computing platform 110 provides Software as a Service (SaaS) functionality and/or other types Internet-based software functions.

Client devices 120 allow users to customize the functionality of the cloud computing provided by cloud computing platform 110. Client devices 120 may be a computing device, such as, for example, a desktop computer, a laptop computer, a mobile phone, a tablet device, and/or other computing devices capable of enabling cloud-based computing. Client devices 120 may communicate with cloud computing platform 110 via network 130 and/or a network protocol to send and receive data over network 130. Network 130 is a network capable of transmitting information either in a wired or wireless manner and may be, for example, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, or an asynchronous transfer mode, and/or a combination of the listed protocols.

Based on communications with client devices 120, cloud computing platform 110 utilizes various components to allow user customization and user designation of objects as favorites. In an embodiment, cloud computing platform 110 includes a communication interface 111, layout generation interface 112, favorites database 113, content database 114, and/or application database 115. These components may be instantiated and/or may execute the methods described herein using hardware that comprises cloud computing platform 110.

Communication interface 111 operates to connect cloud computing platform 110 to client devices 120 via network 130. Communication interface 111 transmits data to client devices 120 such that client devices 120 are able to display graphical user interfaces that allow users to utilize the cloud computing functionality provided by cloud computing platform 110. Based on these interactions, users are able to manipulate data, generate communications, and/or access software features provided by cloud computing platform 110. Communication interface 111 is able to receive these interactions and process the interactions according to the user commands.

In an embodiment, the user may complete a sign-on process that allows the user to securely access cloud computing platform 110. This sign-on process may include an authentication process and/or a password submission process. The sign-on process may also grant users access to content and/or applications based on permissions granted to the user account completing the sign-on process. In an embodiment, users may also access objects designated as favorites based on this sign-on procedure.

Once a user has gained access to cloud computing platform 110, the user is able to access content and/or applications provided by cloud computing platform 110. The user may utilize a graphical user interface displayed on a client device 120 to retrieve, interact with, and/or manipulate the content and/or applications provided by cloud computing platform 110.

In an embodiment, the user may choose to view particular instances of content and/or applications. The user may select a single content object, a single application, multiple content objects, multiple applications, and/or a combination of content objects and application objects. In an embodiment, the selected content may be a webpage, web tabs, a text file, a video file, an audio file, a spreadsheet, a presentation, posts or messages in a communication interface, a calendar event, records, reports, lists, notes, and/or other instances of recorded data that may be accessible. The selected applications may be executable software programs. For example, the application may be one or more of word processing programs, spreadsheet processing programs, email management programs, communication messaging programs, calendar applications, contact list management programs, time management programs, programming interfaces, video manipulation programs, drawing programs, data visualization programs, games, and/or other computing programs. In an embodiment, applications may utilize a Software as a Service (SaaS) configuration and/or provide cloud-based computing features to a native operating system.

Based on the selection, the user is able to view the selected content and/or applications on a graphical user display displayed on the user's client device 120. The user may view the content, play the content if the content includes an audio or video component, navigate among selected content, edit the content, and/or utilize an application in conjunction with the content. For example, the content may be a list of contacts and the application may be an Internet-based telephone program. The user may select particular contact information and utilize the telephone program to initiate a telephone call with the person associated with the particular contact information. Other user interactions may include editing documents, presentations, and/or spreadsheets, generating textual communications, such as via email or via a message posting and/or feed configuration, viewing graphical representations of data, viewing and/or modifying entered data, such as data entered into a list or notes, responding to tasks, managing calendar event items, reading articles, enabling additional applications, browsing Internet webpages, and/or other cloud-based computing features.

Figure 3:
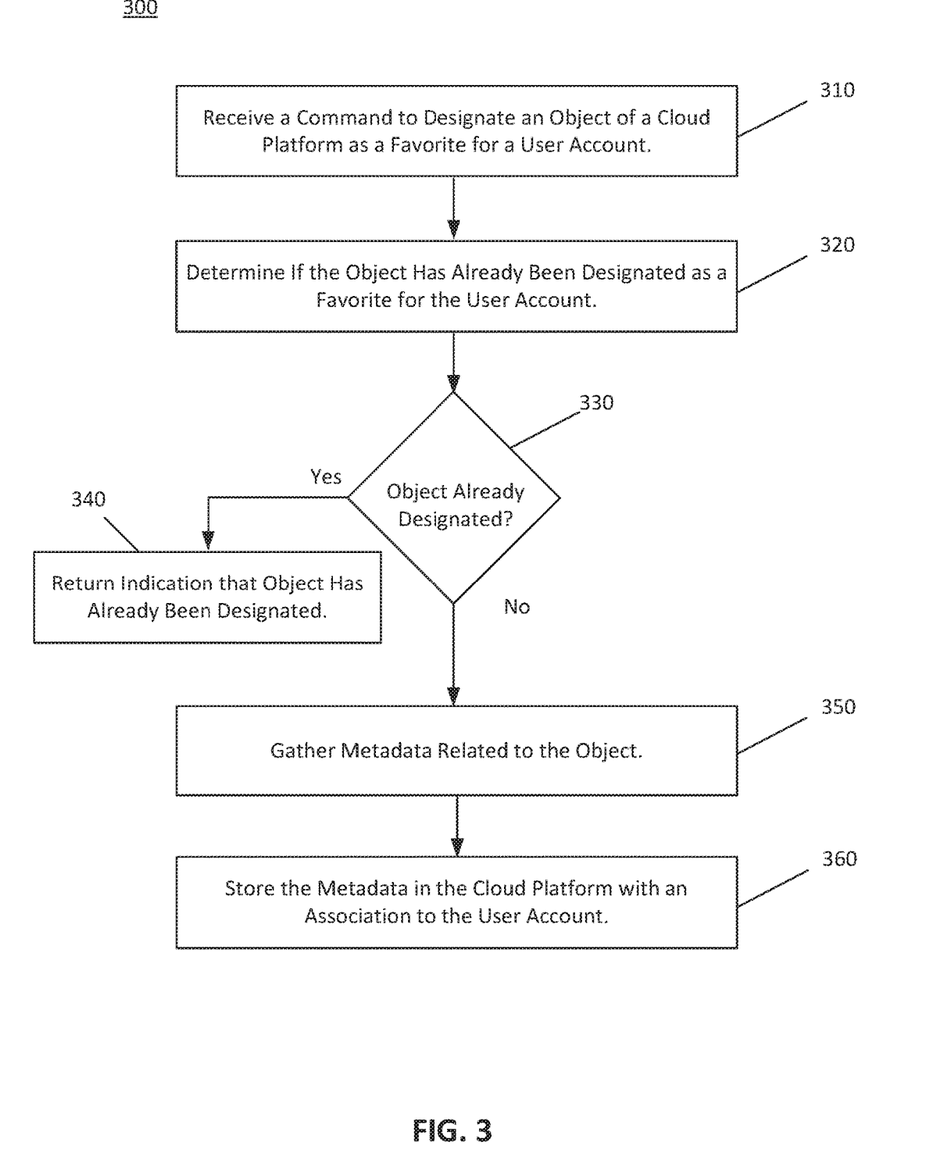
FIG. 3 illustrates a flowchart illustrating a method for designating an object as a favorite, according to some embodiments.

In addition to interacting with content and/or applications provided by cloud computing platform 110, users are also able to designate objects as favorites. Designating an object as a favorite may indicate that the user would like to save a particular object in an easily-accessible manner so that the user may quickly retrieve the favorite object at a later time. Designating an object as a favorite may allow a user to utilize fewer interactions, clicks, and/or keystrokes to retrieve the object. In an embodiment, the user may designate an object as a favorite via an interaction with the graphical user interface displayed on the user's particular client device 120. Communication interface 111 then receives this designation command and is able to designate the desired object as a favorite. The discussion described with reference to FIG. 3 provides an embodiment of a method executed by cloud computing platform 110 to designate an object as a favorite. In an embodiment, the object may be a screen view as shown on the client device 120 and a user may be able to designate the items seen on the screen view as a favorite context.

In an embodiment, when the user designates an object as a favorite, cloud computing platform 110 determines if the user account associated with the user has previously designated the object as a favorite. For example, cloud computing platform 110 checks favorites database 113 to determine if the user account supplying the designation command has already designated the object as a favorite. Cloud computing platform 110 may search a list of objects stored in favorites database 113 and associated with the user account to determine if a match exists between an object on the list and the current object being requested to be designated as a favorite.

If the object has been previously designated as a favorite, cloud computing platform 110 may return a notification that the object has already been designated. Cloud computing platform 110 may then allow the client device 120 to access the current list of favorite objects and/or modify the list.

If the object had not been previously designated as a favorite, cloud computing platform 110 may gather metadata related to the object. Cloud computing platform 110 may store the gathered metadata in favorites database 113 with an association to the user account requesting the designation. In this manner, cloud computing platform 110 may build a list of favorite objects for each user account. The list may include the gathered metadata for each object designated as a favorite.

The metadata gathered and/or stored may include:

- an object identification, such as, for example, a code indicating the specific object to be designated as a favorite;
- a resource locator, such as, for example, an internal data storage location, a remote storage location, and/or a Uniform Resource Locator (URL);
- a favorite order designation, such as, for example, a position that the user wishes to place the object among a list of other objects designated as a favorite;
- a date and/or time stamp corresponding to when the object was designated as a favorite;
- a date and/or time stamp corresponding to when the user last accessed the object;
- a number of instances that a user has accessed the object;
- icons and/or visual depictions associated with the object;
- the type of client device 120 and/or information related to the client device 120 requesting the favorite designation; and/or
- context data, which may include a combination of content and/or applications to be displayed when a context object is selected, layout information, such as the placement of the content and/or applications in the graphical user interface, interactions between content and an application, such as, for example, designating a charting program to generate a pie chart of underlying data, and/or other user settings associated with the content and/or applications.

Because the object may be content, an application, or a context, metadata may aid in distinguishing between the different objects and the system resources required to access the resources. For example, if the object to be designated as a favorite is content, the metadata may include an address or resource locator indicating where the content is stored. In an embodiment, content database 114 stores the content, and metadata stored in favorites database 113 includes a reference pointer to the location of the favorite content in content database 114. Similarly, if the object to be designated as a favorite, is an application, the metadata may include an address or resource locator indicating where program files associated with the application are stored. In an embodiment, application database 115 stores the program files, and metadata stored in favorites database 113 includes a reference pointer to the location of program files associated with the favorite application in application database 115.

In an embodiment, the object may be a context, which may include a combination of one or more pieces of content and/or one or more applications. In an embodiment, a user may organize the pieces of content and/or the applications on a graphical user interface into a layout, and the layout may be the object to be designated as a favorite. In an embodiment, the user may select the content or applications and may generate a particular arrangement and/or placement of the selected content or applications. When a user designates this arrangement, or context, as a favorite object, cloud computing platform 110 may store metadata related to this arrangement in favorites database 113.

The stored metadata for the context may include layout information. For example, the metadata may include sizing information related to the amount of space a piece of content and/or an application occupies on a graphical user interface. Sizing information may also include the amount of content displayed (e.g., a number of rows or columns of a spreadsheet or a number of listed contacts) and/or the number of features displayed of an application. In an embodiment, the metadata may include location information, such as, for example, the location of the content and/or application on a graphical user interface displayed on client device 120. The location information may designate where a piece of content and/or an application is located relative to other content and/or other applications.

In an embodiment, the metadata may utilize absolute and/or relative values to designate sizing and/or location information. For example, when designating the size of content, the metadata may designate an absolute size such as ten rows of a spreadsheet. In another example, the metadata may designate the size of an application window as a particular number of pixels on a screen.

In an embodiment, the metadata may utilize relative values when designating an object as a favorite. For example, the metadata may instruct cloud computing platform 110 to utilize the screen dimensions of a client device 120 to compute the size and/or location. For example, the metadata may instruct cloud computing platform 110 to fill the bottom half of a screen with a particular piece of content. In an embodiment, a user may set and/or modify these instructions depending on how the user wishes to view the content. Similarly, the metadata may instruct cloud computing platform to divide the client device 120 screen size into quadrants and that the location of a particular application will be in the bottom-right quadrant. The metadata may also utilize relative values to designate sizing or locations relative to other objects. For example, the metadata may dictate that a first piece of content occupy half the space of a second piece of content and that the first piece of content be located to the left of the second piece of content.

In an embodiment, cloud computing platform 110 allows for client device 120 to add a context object using a global interaction feature. That is, regardless of the navigation and/or display of the client device 120, cloud computing platform 110 is able to capture the objects displayed on the graphical user interface screen of the client device 120 and save the metadata associated with the currently viewed screen as a favorite object. In an embodiment, cloud computing platform 110 receives a global favorite command. The global favorite command may be a tap or click in a designated area of the graphical user interface displayed on client device 120. Upon receipt of this command, cloud computing platform 110 analyzes the objects currently displayed on the graphical user interface. During this analysis, cloud computing platform 110 may extract metadata related to the content and/or applications displayed and/or may generate metadata based on the layout of the currently displayed graphical user interface. In an embodiment, because cloud computing platform 110 hosts the content and/or applications utilized by client device 120, cloud computing platform 110 is able to easily access this metadata information from within its internal registries and memory. After gathering the metadata related to the content, application, and/or context, cloud computing platform 110 stores this metadata in favorites database 113 and designates the context as a favorite object. Users may then be able to select the context as a favorite object and cloud computing platform 110 may recreate the screen view.

In an embodiment, metadata includes information related to the client device 120 making the favorite designation. For example, metadata may include the device type, connection information, such as an IP address, screen resolution size, and/or other client device 120 information. Using this information, cloud computing platform 110 may selectively recreate objects that have been designated as a favorite when a user chooses to view the favorite object. For example, if an object was designated as a favorite using a desktop or laptop client device 120A, but the object is incompatible with phone client device 120B, cloud computing platform 110 may restrict access to the object when the user account attempts to view the object using a phone client device 120B. In an embodiment, metadata related to a client device 120 may include screen resolution. In an embodiment, the metadata may include user account information indicating the screen resolution of the client device 120 that the user is utilizing to retrieve a favorite object. As discussed above, cloud computing platform 110 may utilize this screen resolution information when generating a new graphical user interface to display an object added as a favorite. Cloud computing platform 110 may alter a previously designated favorite object based on this screen resolution information. In an embodiment, cloud computing platform 110 may attempt to create a "best fit" if the current screen resolution differs from the previously stored screen resolution. That is, cloud computing platform 110 may alter the dimensions and/or location of content and/or applications previously designated as a favorite so that the content and/or applications fit on the current client device 120. For example, cloud computing platform 110 may generate a new graphical user interface to display the content and/or applications so that the content and/or applications designated as favorites are viewable. In an embodiment, cloud computing platform 110 may arrange the content and/or applications to hide certain objects. For example, if the current client device 120 is a phone screen and/or has a smaller screen resolution, cloud computing platform 110 may generate a better viewing experience with larger text by displaying the objects one at a time rather than all together in a single graphical user interface that displays all of the objects.

Figure 4:
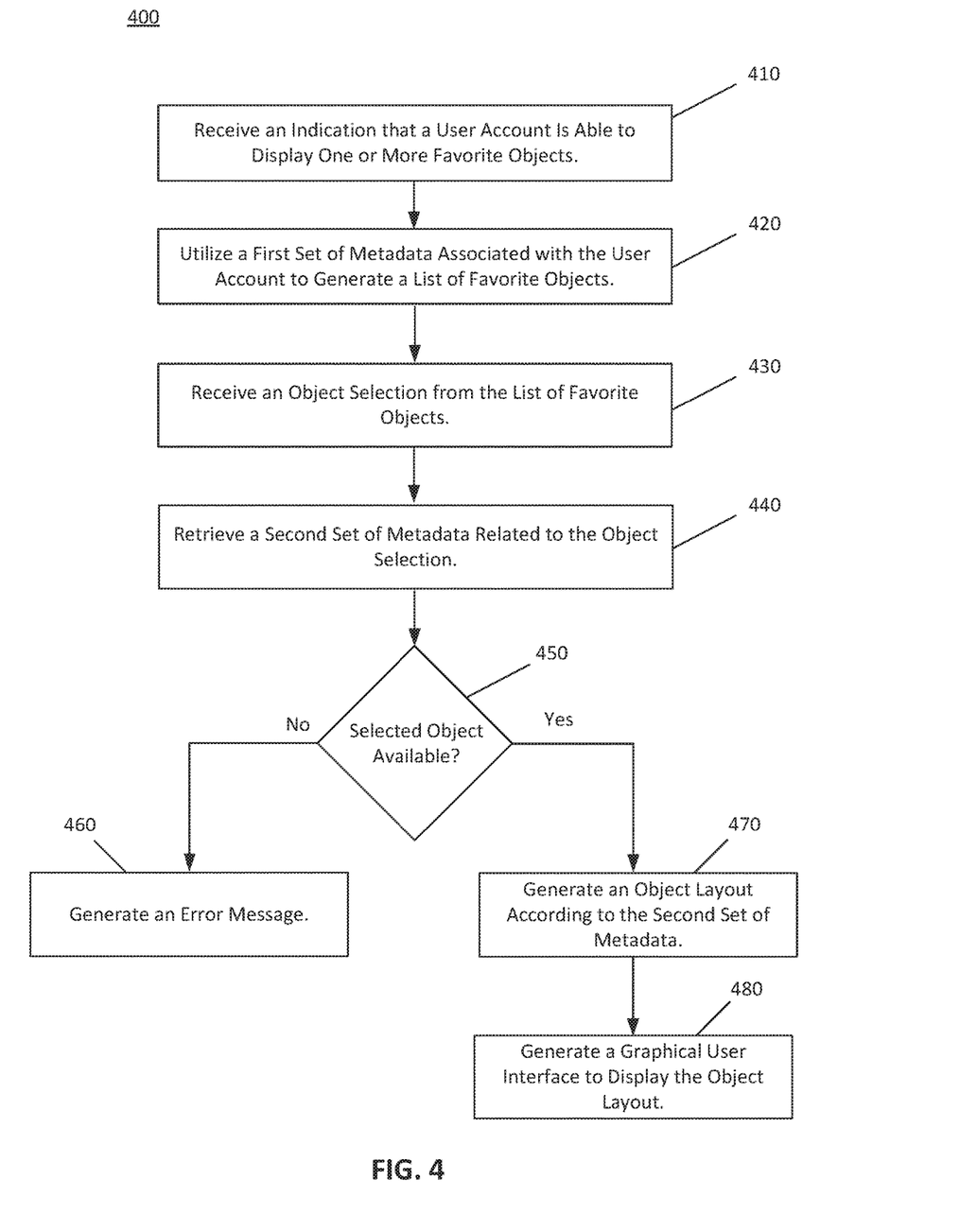
FIG. 4 illustrates a flowchart illustrating a method for retrieving a favorite object, according to some embodiments.

To retrieve an object and generate a new graphical user interface that displays the object, cloud computing platform first receives a command from a client device 120 instructing cloud computing platform 110 to retrieve an object designated as a favorite. The description discussed with respect to FIG. 4 provides an embodiment of the retrieval and display of an object designated as a favorite.

In an embodiment, cloud computing platform 110 may receive an indication that a user account is able to display one or more favorite objects. For example, a user may sign-in to cloud computing platform 110 to utilize the cloud computing functionality provided by cloud computing platform 110. In an embodiment, the user may select a favorite list from a graphical user interface to view the objects that the user has previously designated as a favorite. In this embodiment, cloud computing platform 110 accesses a first set of metadata associated with the user account to display the objects that the user has previously designated as a favorite.

In an embodiment, layout generation interface 112 retrieves the first set of metadata from favorites database 113. Layout generation interface 112 may control the graphical user interface layout arranged by cloud computing platform 110 and transmitted to a client device 120 via communication interface 111. In an embodiment, layout generation interface 112 may utilize the first set of metadata associated with the user account to generate a list of favorite objects. This list may provide brief indicators of the favorite object. For example, the list may include a title of the content, application, and/or context designated as a favorite. Cloud computing platform 110 may have defined this title when generating the metadata at first storage and/or the user may have set a title when choosing to designate the object as a favorite.

In an embodiment, the first set of metadata may also include a visual component to be displayed in the list. The visual component may be, for example, a preview of the object and/or an icon representative of the object. For example, if the object is a contact list, the icon may be an image of a rolodex. In another example, if the object is a specific contact, the visual component may be a photograph of the contact. Users may designate these visual components in the metadata or cloud computing platform 110 may utilize default visual components corresponding to the object type.

Layout generation interface 112 may utilize this first set of metadata to generate the list of favorite objects. Layout generation interface 112 may then transmit this to the client device 120. In response to viewing the list, client device 120 may transmit an object selection from the list of favorite objects. Communication interface 111 may receive this selection and pass the selection to layout generation interface 112. The selection may indicate that the user wishes to retrieve the favorite object and display the favorite object on client device 120.

Based on the selection, layout generation interface 112 may retrieve a second set of metadata related to the object selection. In an embodiment, the second set of metadata may differ from the first set of metadata because the first set of metadata provides a list of favorite objects while the second set of metadata may be specific to the selected object. Layout generation interface 112 retrieves the second set of metadata from favorites database 113. Using the second set of metadata, layout generation interface 112 may determine whether the selected object is still available. In an embodiment, the second set of metadata includes a resource locator indicating the storage location of the object. For example, if the object is content, the second set of metadata may include a pointer or a reference to memory in content database 114 that stores the desired content. Similarly, if the object is an application, the second set of metadata may include locations in application database 115 storing program files utilized by the application.

Based on the check, layout generation interface 112 may determine that the desired object is unavailable. In an embodiment, if the object is a context, layout generation interface 112 may determine that a piece of content and/or an application utilized in the context is unavailable. The piece of content and/or the application may be unavailable because the object was deleted and/or modified in cloud computing platform 110. Layout generation interface 112 may detect that the favorite object is unavailable when attempting to access a resource location indicated by the second set of metadata. If layout generation interface 112 is unable to retrieve content and/or application data, layout generation interface 112 recognizes that the favorite object is unavailable.

When content and/or an application is unavailable, layout generation interface 112 may generate an error message indicating that the desired object is unavailable. Layout generation interface 112 may allow the user to edit the favorite objects associated with the user account to remedy this unavailability. For example, layout generation interface 112 may allow the user to delete the favorite object, designate a new destination path to locate the object, and/or generate a support ticket to an administrator of cloud computing platform 110.

If the object is available, however, layout generation interface 112 may successfully retrieve the content and/or application using the resource locator designated in the second set of metadata. In an embodiment, if the object is a context, layout generation interface 112 may retrieve multiple pieces of content and/or applications using the second set of metadata associated with the context. Layout generation interface 112 then generates an object layout according to the second set of metadata. In an embodiment, layout generation interface 112 retrieves favorite content from content database 114 and one or more favorite applications from application database 115. Using the other metadata included in the second set of metadata, such as sizing and/or location metadata, layout generation interface 112 generates a layout according to the previously designated favorite object. In an embodiment, if the previously designated favorite object was created based on an analysis of a displayed graphical user interface, layout generation interface 112 utilizes the second set of metadata to recreate the previously displayed graphical user interface. In this manner, a user may utilize the selection to recreate the stored context, which may include particular content and/or applications as well as sizing and location parameters that place the content and/or applications in the graphical user interface.

In an embodiment, when generating the object layout, layout generation interface 112 is also able to retrieve updated versions of content and/or applications. For example, if a first user has designated a spreadsheet as a favorite object and another user edits the spreadsheet, when the first user retrieves the spreadsheet via a selection of a favorite object, layout generation interface 112 is able to retrieve the spreadsheet with the edits. In an embodiment, layout generation interface 112 provides the option to a user to selection which version they wish to receive. Similarly, if a user has designated a particular application as a favorite and an administrator of cloud computing platform 110 has updated and/or patched the application, layout generation interface 110 is able to provide the updated application to the user and/or allow the user to select a desired version of the application.

If the favorite object is a context that includes content interaction with an application, layout generation interface 112 is also able to update the interaction. For example, a first set of data may be utilized as content. The user may utilize cloud computing platform 110 and a data visualization application to generate a pie chart of the first set of data. Cloud computing platform 110 may generate the desired pie chart, linking the data visualization application to the underlying content (i.e., the first set of data). The user may then designate this context, which includes the content and the application, as a favorite object.

In an embodiment, a context may include two applications that utilize the first set of data. For example, a first application may utilize the first set of data to generate a pie chart while a second application may utilize the first set of data to generate a bar graph. The context may preserve this configuration and link the first and second applications to the first set of data.

In an embodiment, a second user may alter the first set of data, modifying data values and/or data entries and transforming the first set of data into a second set of data. When the user selects the previous context object to visualize this data, layout generation interface 112 is able to utilize the second set of data in conjunction with the data visualization application to generate an updated pie chart and/or bar graph that depicts the second set of data. In this manner, layout generation interface 112 is able to reproduce the context object as well as update the interactions between the content and applications.

After generating an object layout with updated content and application linking, layout generation interface 112 may convert the layout into a graphical user interface to be displayed at client device 120. Layout generation interface 112 passes this graphical user interface to communication interface 111 to transmit to client device 120. Client device 120 is then able to view the object layout in a graphical user interface and view the selected favorite object.

Figure 2A:
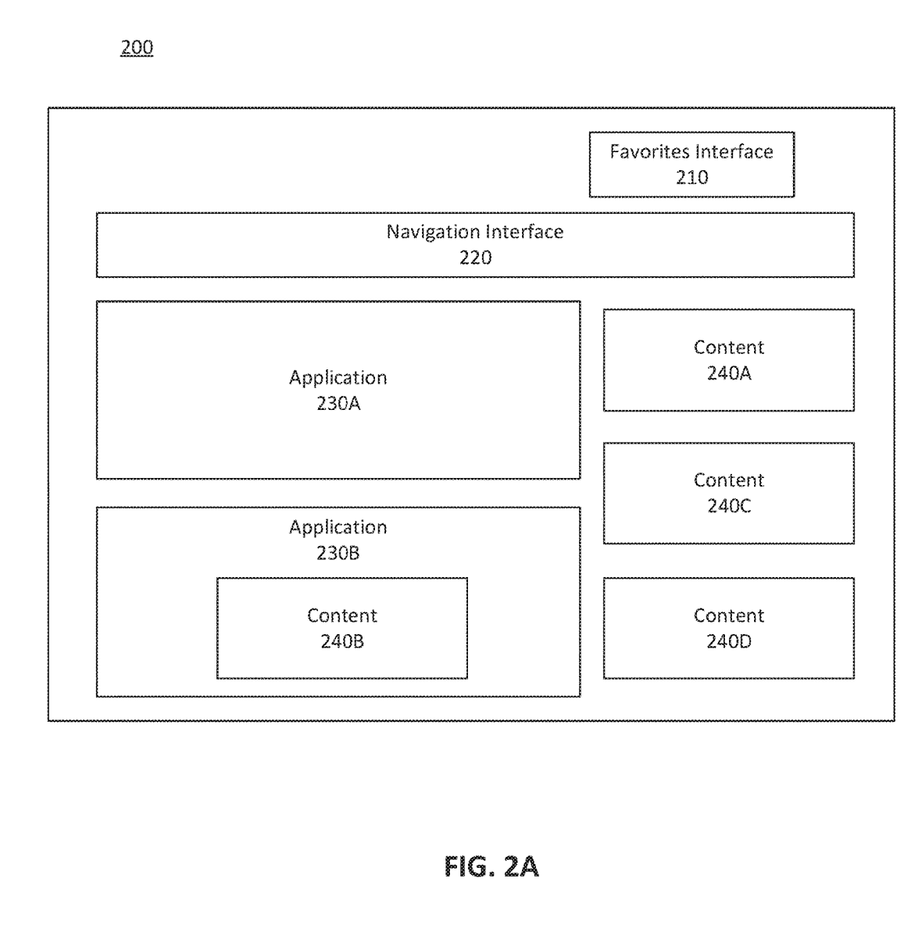
FIG. 2A illustrates a block diagram of a graphical user interface displaying multiple objects, according to some embodiments.
Figure 2B:
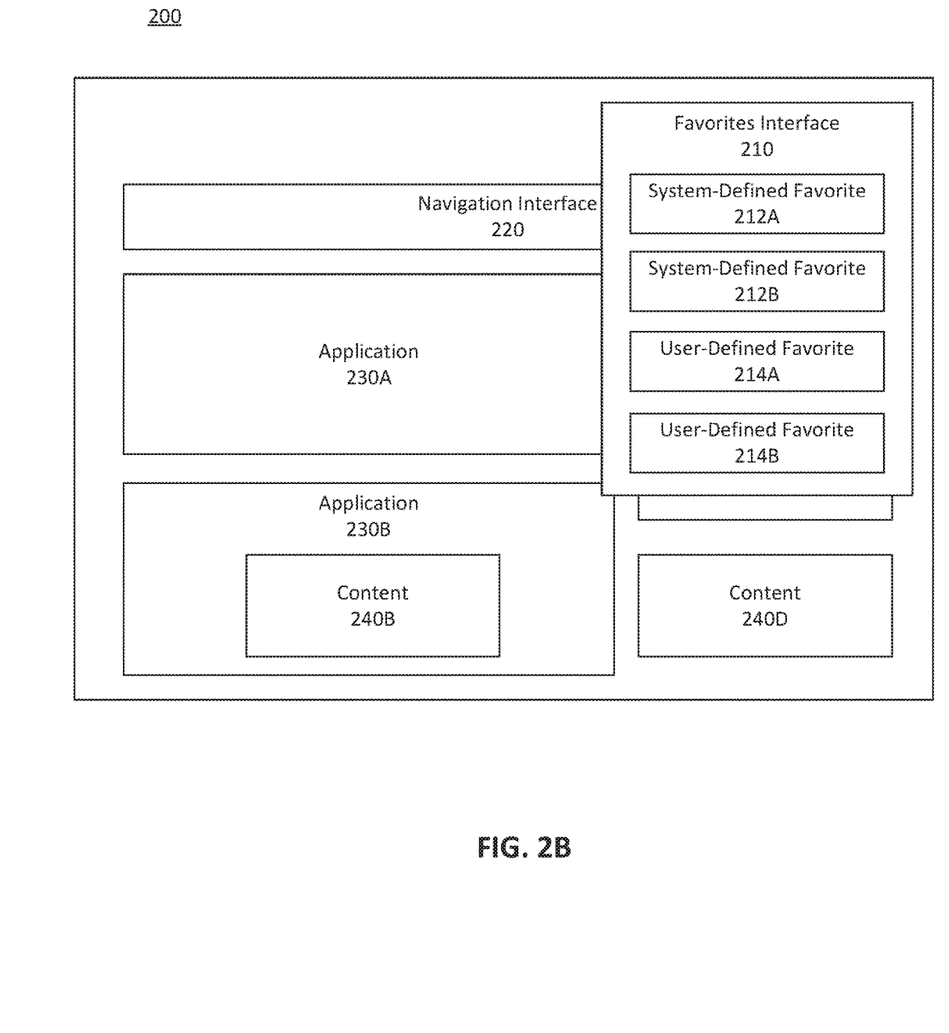
FIG. 2B illustrates a block diagram of a graphical user interface displaying an expanded favorites interface, according to some embodiments.

FIG. 2A illustrates a block diagram of a graphical user interface (GUI) 200 displaying multiple objects, according to some embodiments. FIG. 2B illustrates a block diagram of the graphical user interface (GUI) 200 displaying an expanded favorites interface, according to some embodiments. In both figures, GUI 200 depicts a graphical user interface that may be displayed by a client device 120 as described with reference to FIG. 1. GUI 200 as depicted in FIG. 2A displays a minimized view of favorites interface 210 while GUI 200 as depicted in FIG. 2B displays an expanded view of favorites interface 210. Favorites interface 210 may obscure some components of GUI 200 as shown in FIG. 2B. The other components of GUI 200, however, are common between FIG. 2A and FIG. 2B.

In an embodiment, cloud computing platform 110 may generate GUI 200. A client device 120 may display GUI 200. Users may interact with GUI 200 to utilize the cloud computing functionality of cloud computing platform 110. In an embodiment, GUI 200 includes favorites interface 210, navigation interface 220, applications 230A and 230B, and content 240A-240D.

In an embodiment, a user may utilize navigation interface 220 to browse available content and/or applications provided by cloud computing platform 110. Navigation interface 220 may include tabs, search bars, icons, and/or other visual displays allowing a user to select content and/or applications. In an embodiment, navigation interface 220 includes links and/or reference pointers to data stored within cloud computing platform 110. In an embodiment, navigation interface 220 allows users to browse Internet-based webpages.

In an embodiment displayed in FIG. 2A and FIG. 2B, a user may have utilized navigation interface 220 to select applications 230A-230B and content 240A-240D to view in GUI 200. Based on these selections, GUI 200 depicts the selected applications and/or content. Users may select more or less than the applications and/or content shown in FIG. 2A. Users also need not select both an application and content and may select one or the other.

In the embodiment depicted in FIG. 2A, a user has selected two applications 230A-230B and four pieces of content 240A-240D. In an embodiment, the two applications are arranged to the left side of GUI 200 while content 240A, 240B, and 240D are arranged to the right side of GUI 200. A user may interact with GUI 200 to arrange the placement of these objects. For example, a user may be able to select and/or drag the objects to various locations in GUI 200. In an embodiment, the user may adjust the size of object as displayed on GUI 200.

In an embodiment, application 230B includes a representation and/or display of content 240B. For example, application 230B may be an audio editing application while content 240B may be an audio track. In an embodiment, GUI 200 application 230B may generate a visualization of the audio track of content 240B in the form of a waveform and/or a measure of decibels over time. In this manner, GUI 200 depicts the visualization of content 240B within application 230B. A user may interact with application 230B to further manipulate this view and may, for example, choose to view the audio track in terms of frequencies rather than as a function of time. A user may interact with application 230B to select this visualization.

In an embodiment, a user may interact with favorites interface 210 to designate an object as a favorite. For example, favorites interface 210 may be a global icon that remains fixed while a user interacts with applications 230 and content 240. Users may tap and/or click on favorites interface 210 to designate a particular application 230 or particular content 240 as a favorite. If GUI 200 is provided to a client device 120 by a cloud computing platform 110, the designation of a favorite may cause cloud computing platform 110 to store metadata related to the particular designated application 230 or content 240.

In an embodiment, a user may select favorites interface 210 to designate the currently displayed context as a favorite object. In the embodiment depicted in FIG. 2A, the context may include applications 230A-230B, content 240A-240D, the interaction between application 230B and content 230B, and/or the layout and/or sizing of the applications 230 and content 240 as depicted on GUI 200. Cloud computing platform 110 may store metadata related to GUI 200 if a user interacts with favorites interface 210 and indicates that the user wishes to preserve the currently displayed context as a favorite. In an embodiment, generating this selection may include a click, tap, and/or toggle of an icon depicted in favorites interface 210.

Referring to FIG. 2B, GUI 200 may display an expanded view of favorites interface 210 when the user wishes to select an object that has been previously designated as a favorite. In an embodiment, a user may selection favorites interface 210 to expand the view. In an embodiment, this expansion may cause favorites interface 210 to obscure some portions of GUI 200, such as, for example, covering a portion of navigation interface 220 and/or content 240A and 240C. This expansion may allow a user to focus on the list of objects depicted in favorites interface 210.

In an embodiment, the expanded version of favorites interface 210 may include a list of favorite objects. While the list may include user defined favorites 214A-214B, the list may, in some embodiments, also include system-defined favorites 212A-212B. As previously discussed, the user-defined favorites 214 may be objects that a user has previously designated as a favorite. A user-defined favorite 214 may be an object, such as content, an application, and/or a context. When the user chooses to expand favorites interface 210, cloud computing platform 110 may access favorites database 113 to retrieve metadata related to the user-defined favorites 214 to generate the list displayed on favorites interface 210. The number of user-defined favorites 214 may vary. The number of displayed user-defined favorites 214 may depend on the number of objects designated as a favorite, the screen resolution of the client device 120 displaying GUI 200, and/or a predefined or calculated number. In an embodiment, favorites interface 210 may include a scrolling bar or navigation button that allows a user to view and/or look through the objects identified in favorites interface 210. While two user-defined favorites are depicted in FIG. 2B, the number of user-defined favorites displayed may vary according to the parameters described above.

In an embodiment, favorites interface 210 may not include system-defined favorites 212A-212B. In an embodiment, favorites interface 210 may include system-defined favorites 212 along with user defined favorites 214. A system-defined favorite 212 may be an object that cloud computing platform 110 has designated as a "high-frequency" object. In an embodiment, a high-frequency object may be an object that is frequently accessed by the user. In an embodiment, cloud computing platform 110 may designate these objects as a favorite even if the user has not explicitly performed the designation. In this manner, cloud computing platform 110 may identify objects relevant to the user even if the user has not designated the object as a favorite. In an embodiment, the system-defined favorites 212 may be contexts. In this scenario, cloud computing platform 110 may recognize particular configurations and/or arrangements frequently utilized by the user and may store these arrangement as favorites contexts.

Via the expansion of favorites interface 210, a user is able to view objects marked as favorites and select a desired object from the list. Based on this selection, cloud computing platform 110 is able to reconfigure GUI 200 to display the selected object.

FIG. 3 illustrates a flowchart illustrating a method 300 for designating an object as a favorite, according to some embodiments. Method 300 shall be described with reference to FIG. 1; however, method 300 is not limited to that example embodiment.

In an embodiment, cloud computing platform 110 utilizes method 300 to receive a designation of an object as a favorite and/or store a record with metadata indicating that a user account has designate the object as a favorite. The foregoing description will describe an embodiment of the execution of method 300 with respect to cloud computing platform 110. While method 300 is described with reference to cloud computing platform 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 310, cloud computing platform 110 receives a command to designate an object as a favorite for a user account. Designating an object as a favorite may indicate that the user would like to save a particular object in an easily-accessible manner so that the user can easily retrieve the favorite object at a later time. In an embodiment, the user may designate an object as a favorite via an interaction with the graphical user interface displayed on the user's particular client device 120. Communication interface 111 then receives this designation command and is able to designate the desired object as a favorite. In an embodiment, the object may be particular content, a particular application, and/or a screen view displayed on the client device 120. The user may be able to designate the content and/or applications displayed on the screen view as a favorite context.

At 320, cloud computing platform 110 determines whether the object has already been designated as a favorite for the user account. For example, cloud computing platform 110 may check favorites database 113 to determine if the user account supplying the designation command has already designated the object as a favorite. Cloud computing platform 110 may search a list of objects stored in favorites database 113 and associated with the user account to determine if a match exists between an object on the list and the current object requested to be designated as a favorite. At 330, a determination is made based on this search.

If the user has already designated the object as a favorite, at 340, cloud computing platform 110 returns a notification that the object has already been designated. Cloud computing platform 110 may then allow the client device 120 to access the current list of favorite objects and/or modify the list.

At 350, if the object had not been previously designated as a favorite, cloud computing platform 110 may gather metadata related to the object. The type of metadata gathered was previously described with reference to FIG. 1. This metadata may include a resource locator indicating the location in internal and/or external memory where a particular object is stored. At 360, cloud computing platform 110 may store the gathered metadata in favorites database 113 with an association to the user account requesting the designation. In this manner, cloud computing platform 110 may build a list of favorite objects for each user account. The list may include the gathered metadata for each object designated as a favorite.

FIG. 4 illustrates a flowchart illustrating a method 400 for retrieving a favorite object, according to some embodiments. Method 400 shall be described with reference to FIG. 1; however, method 400 is not limited to that example embodiment.

In an embodiment, cloud computing platform 110 utilizes method 400 to retrieve an object that has been previously designated as a favorite and/or to generate a display of the object for the user. The foregoing description will describe an embodiment of the execution of method 400 with respect to cloud computing platform 110. While method 400 is described with reference to cloud computing platform 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 410, cloud computing platform 110 may receive an indication that a user account is able to display one or more favorite objects. For example, a user may sign-in to cloud computing platform 110 to utilize the cloud computing functionality provided by cloud computing platform 110. In an embodiment, the user may select a favorite list from a graphical user interface to view the objects that the user has previously designated as a favorite.

In an embodiment, at 420, cloud computing platform 110 accesses a first set of metadata associated with the user account to display the objects that the user has previously designated as a favorite. In an embodiment, the cloud computing platform may display the favorite objects in a list. In an embodiment, layout generation interface 112 retrieves the first set of metadata from favorites database 113. Layout generation interface 112 may control the graphical user interface layout arranged by cloud computing platform 110. In an embodiment, layout generation interface 112 may utilize the first set of metadata associated with the user account to generate the list of favorite objects. This list may provide brief indicators of the favorite object. For example, the list may include a title of the content, application, and/or context designated as a favorite. Cloud computing platform 110 may have defined this title when generating the metadata at first storage and/or the user may have set a title when choosing to designate the object as a favorite.

In an embodiment, the first set of metadata may also include a visual component to be displayed in the list. The visual component may be, for example, a preview of the object and/or an icon representative of the object. For example, if the object is a contact list, the icon may be an image of a rolodex. In another example, if the object is a specific contact, the visual component may be a photograph of the contact. Users may designate these visual components in the metadata or cloud computing platform 110 may utilize default visual components corresponding to the object type. Layout generation interface 112 may utilize this first set of metadata to generate the list of favorite objects. Layout generation interface 112 may then transmit this to the client device 120.

At 430, in response to viewing the list, client device 120 may transmit an object selection from the list of favorite objects. Communication interface 111 may receive this selection and pass the selection to layout generation interface 112. The selection may indicate that the user wishes to retrieve the favorite object and display the favorite object on client device 120.

At 440, based on the selection, cloud computing platform 110 may retrieve a second set of metadata related to the object selection. In an embodiment, the second set of metadata differs from the first set of metadata because the first set of metadata provides a list of favorite objects while the second set of metadata is specific to the selected object. Layout generation interface 112 retrieves the second set of metadata from favorites database 113.

At 450, using the second set of metadata, layout generation interface 112 checks to determine if the selected object is still available. In an embodiment, the second set of metadata includes a resource locator indicating the storage location of the object. For example, if the object is content, the second set of metadata may include a pointer or a reference to memory in content database 114 that stores the desired content. Similarly, if the object is an application, the second set of metadata may include locations in application database 115 storing program files utilized by the application.

Based on the check at 450, layout generation interface 112 may determine that the desired object is unavailable. In an embodiment, if the object is a context, layout generation interface 112 may determine that a piece of content and/or an application utilized in the context is unavailable. The piece of content and/or the application may be unavailable because the object was deleted and/or modified in cloud computing platform 110. Layout generation interface 112 may detect that the favorite object is unavailable when attempting to access a resource location indicated by the second set of metadata. If layout generation interface 112 is unable to retrieve content and/or application data, layout generation interface 112 recognizes that the favorite object is unavailable.

At 460, when content and/or an application is unavailable, layout generation interface 112 may generate an error message indicating that the desired object is unavailable. Layout generation interface 112 may allow the user to edit the favorite objects associated with the user account to remedy this unavailability. For example, layout generation interface 112 may allow the user to delete the favorite object, designate a new destination path to locate the object, and/or generate a support ticket to an administrator of cloud computing platform 110.

At 470, if the object is available, cloud computing platform 110 will generate an object layout according to the second set of metadata. For example, layout generation interface 112 will successfully retrieve the content and/or application using the resource locator designated in the second set of metadata. In an embodiment, if the object is a context, layout generation interface 112 may retrieve multiple pieces of content and/or applications using the second set of metadata associated with the context. Layout generation interface 112 then generates an object layout according to the second set of metadata. In an embodiment, layout generation interface 112 retrieves favorite content from content database 114 and one or more favorite applications from application database 115. Using the other metadata included in the second set of metadata, such as sizing and/or location metadata, layout generation interface 112 generates a layout according to the previously designated favorite object. In an embodiment, if the previously designated favorite object was created based on an analysis of a displayed graphical user interface, layout generation interface 112 utilizes the second set of metadata to recreate the previously displayed graphical user interface. In this manner, a user may utilize the selection to recreate the stored context, which may include particular content and/or applications as well as sizing and location parameters that place the content and/or applications in the graphical user interface.

In an embodiment, when generating the object layout, layout generation interface 112 is also able to retrieve updated versions of content and/or applications. If the favorite object is a context that includes content interaction with an application, layout generation interface 112 is also able to update the interaction. Via this updating functionality, the generation of an object layout may include updated content, updated applications, and/or a combination of the two.

At 480, after generating an object layout, cloud computing platform 110 generates a graphical user interface to display the object layout. In an embodiment, layout generation interface 112 passes this graphical user interface to communication interface 111 to transmit to client device 120. Client device 120 is then able to view the object layout in a graphical user interface and view the selected favorite object.

Figure 5:
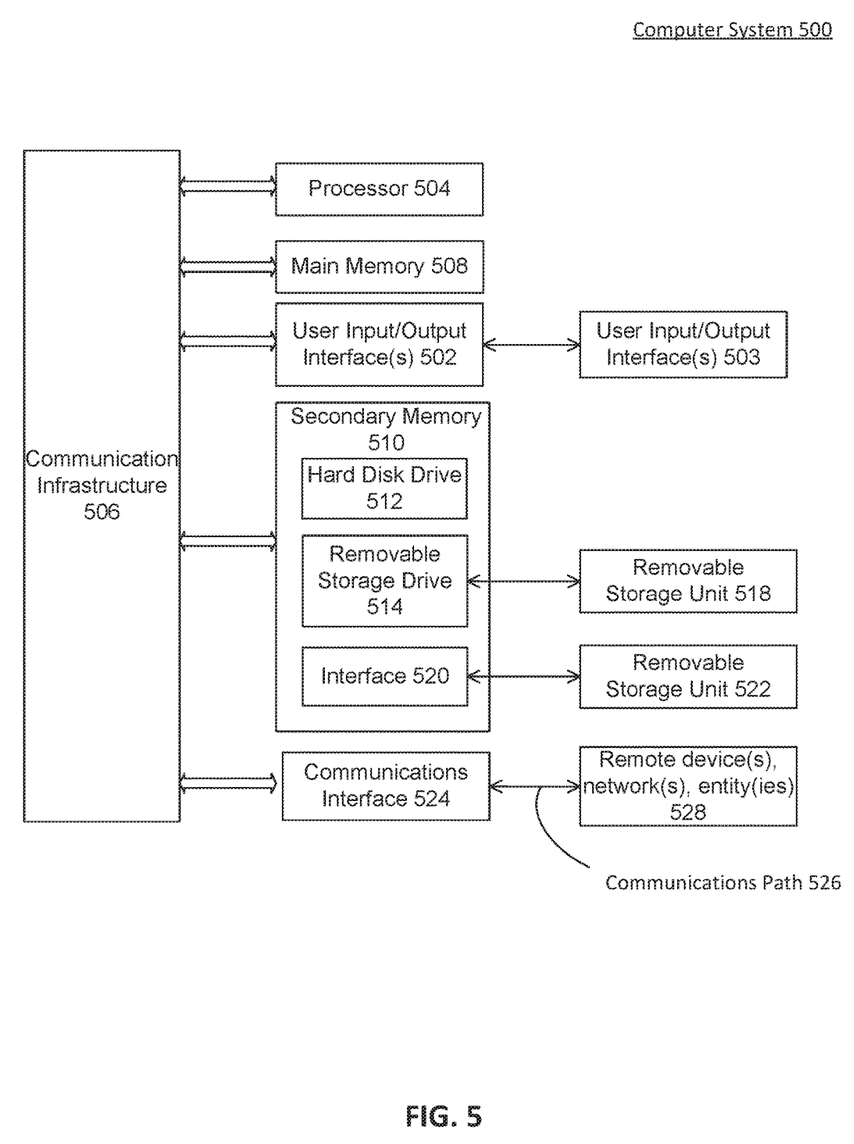
FIG. 5 is an example computer system useful for implementing various embodiments.

FIG. 5 is an example computer system 500 useful for implementing various embodiments. Various embodiments of the disclosure may be implemented, for example, using one or more computer systems, such as computer system 500 shown in FIG. 5. One or more computer systems 500 (or portions thereof) can be used, for example, to implement cloud computing platform 110.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
receiving a selection of an object context, wherein the object context includes an application and content;
retrieving metadata related to the object context, wherein the metadata includes a previously stored graphical user interface arrangement of the application and the content;
generating an object layout according to the metadata, wherein the object layout arranges the application and the content according to the previously stored graphical user interface arrangement; and
generating a graphical user interface that displays the object layout.

2. The computer-implemented method of claim 1, wherein the metadata describes a utilization of the content by the application.

3. The computer-implemented method of claim 1, further comprising:
in response to retrieving the metadata, retrieving an updated version of the content and wherein the object layout utilizes the updated version of the content.

4. The computer-implemented method of claim 1, wherein the previously stored graphical user interface arrangement includes a size parameter related to the content.

5. The computer-implemented method of claim 1, wherein the previously stored graphical user interface arrangement includes a relative location parameter indicating a relative location of the content from the application.

6. The computer-implemented method of claim 1, wherein the selection of the object context includes a selection from a list displaying object contexts based on a frequency of usage.

7. The computer-implemented method of claim 1, further comprising: confirming that the content is available by attempting to retrieve the content from a memory location specified in the metadata.

8. A system, comprising:
a memory; and
one or more processors, coupled to the memory, configured to:
receive a selection of an object context, wherein the object context includes an application and content;
retrieve metadata related to the object context from the memory, wherein the metadata includes a previously stored graphical user interface arrangement of the application and the content;
generate an object layout according to the metadata, wherein the object layout arranges the application and the content according to the previously stored graphical user interface arrangement; and
generate a graphical user interface that displays the object layout.

9. The system of claim 8, wherein the metadata describes a utilization of the content by the application.

10. The system of claim 8, wherein the one or more processors are further configured to:
in response to retrieving the metadata, retrieve an updated version of the content and wherein the object layout utilizes the updated version of the content.

11. The system of claim 8, wherein the previously stored graphical user interface arrangement includes a size parameter related to the content.

12. The system of claim 8, wherein the previously stored graphical user interface arrangement includes a relative location parameter indicating a relative location of the content from the application.

13. The system of claim 8, wherein the selection of the object context includes a selection from a list displaying object contexts based on a frequency of usage.

14. The system of claim 8, wherein the one or more processors are further configured to:
confirm that the content is available by attempting to retrieve the content from a memory location specified in the metadata.

15. A tangible computer-readable device having instructions stored thereon that, when executed by at least one computing device, causes the at least one computing device to perform operations comprising:
receiving a selection of an object context, wherein the object context includes an application and content;
retrieving metadata related to the object context, wherein the metadata includes a previously stored graphical user interface arrangement of the application and the content;
generating an object layout according to the metadata, wherein the object layout arranges the application and the content according to the previously stored graphical user interface arrangement; and
generating a graphical user interface that displays the object layout.

16. The tangible computer-readable device of claim 15, wherein the metadata describes a utilization of the content by the application.

17. The tangible computer-readable device of claim 15, the operations further comprising:
in response to retrieving the metadata, retrieving an updated version of the content and wherein the object layout utilizes the updated version of the content.

18. The tangible computer-readable device of claim 15, wherein the previously stored graphical user interface arrangement includes a size parameter related to the content.

19. The tangible computer-readable device of claim 15, wherein the previously stored graphical user interface arrangement includes a relative location parameter indicating a relative location of the content from the application.

20. The tangible computer-readable device of claim 15, the operations further comprising:
confirming that the content is available by attempting to retrieve the content from a memory location specified in the metadata.

* * * * *